United States Patent [19]

Berger

[11] 4,091,001

[45] May 23, 1978

[54] LIQUID COATING COMPOSITIONS CONTAINING GLYCIDYL ESTER-POLYAMINE BINDERS

[75] Inventor: Dieter Berger, Marl, Germany

[73] Assignee: Chemische Werke Huels Aktiengesellschaft, Marl, Germany

[21] Appl. No.: 686,494

[22] Filed: May 14, 1976

[30] Foreign Application Priority Data

May 17, 1975 Germany .............................. 2522043

[51] Int. Cl.$^2$ ....................... C08G 63/20; C08G 63/12
[52] U.S. Cl. .............................. 260/75 EP; 260/78.41
[58] Field of Search .............. 260/75 EP, 75 N, 78.41

[56] References Cited

U.S. PATENT DOCUMENTS

| | | | |
|---|---|---|---|
| 3,600,459 | 8/1971 | Vasta | 260/834 |
| 3,862,093 | 1/1975 | Jellinek et al. | 260/75 EP |
| 3,912,690 | 10/1975 | Yapp | 260/75 EP |
| 3,979,477 | 9/1976 | Schmid et al. | 260/835 |
| 3,989,767 | 11/1976 | Homma et al. | 260/834 |

*Primary Examiner*—Lucille M. Phynes
*Attorney, Agent, or Firm*—Millen & White

[57] ABSTRACT

Liquid varnish coating compositions having a low or nil solvent content, comprising a mixture of binders and optionally conventional auxiliary agents, which contain, as the binder, a mixture of:

A) glycidyl esters produced in the usual manner by the reaction of esterification products containing carboxyl groups with an excess of a 2,3-epoxyhaloalkane in the presence of reactive agents which split off hydrogen halide; and B) one or more polyamines with at least 3 active hydrogen atoms linked to nitrogen atoms, wherein the nitrogen atoms are bound to aliphatic and/or cycloaliphatic residues which, in turn, can optionally be bound to an aromatic residue, in such an amount that 0.8–1.5 amino hydrogen equivalents are present for one epoxide equivalent of the glycidyl esters.

13 Claims, No Drawings

LIQUID COATING COMPOSITIONS CONTAINING GLYCIDYL ESTER-POLYAMINE BINDERS

CROSS-REFERENCE TO RELATED PATENT APPLICATION

This application is related in subject matter to that of copending, commonly assigned U.S. Pat. application Ser. No. 686,483, filed May 14, 1976, the contents of which are incorporated by reference herein.

BACKGROUND OF THE INVENTION

This invention relates to liquid varnish coating compositions having a low or nil solvent content in which the binder comprises a glycidyl ester and a polyamine having at least three active hydrogen atoms covalently linked to nitrogen atoms.

It is known to cure polyepoxides with anhydrides or polyamines to obtain valuable thermosets used predominantly as coating and molding compounds. The curing of polyepoxides with anhydrides, widely used for the production of molding compounds, has no practical significance for varnishes and coatings, since in spite of a high curing temperature (starting with 120° C.) the processing time at room temperature (pot life) of such varnishes is too brief and the thus-obtained coatings are too brittle. In contrast thereto, the curing of polyepoxides with polyamines and/or polyamidoamines is of great significance for the production of varnishes and coatings; this curing process takes place at room temperature or a slightly elevated temperature (up to about 80° C.). Such cold-setting varnishes are of special interest for the coating of large, bulky articles, e.g. railroad boxcars or bridges, as well as for the coating of heat-sensitive substrates, e.g. wood or synthetic resins which, due to their size or heat sensitivity, cannot be provided with customary baking enamels curing at above 100° C.

Since no cleavage products are liberated during the curing reaction of epoxy groups with amines, it is possible to employ varnishes based on polyepoxides and amines as a binder for the production of thick-layer varnish coats in one operating step, if they can be applied with a low solvent content or even solvent-free. Such low-solvent varnishes which are cured in an additive reaction have the advantages of special economy as well as of being ecologically acceptable. The preparation of low-solvent content or solvent-free varnishes on the basis of polyepoxides and amines is known. In most cases, bisglycidyl ethers are utilized as the polyepoxides in this connection, obtainable by the reaction of 2,2-bis(4-hydroxyphenyl)propane (bisphenol A) and epichlorohydrin. Depending on how this reaction is conducted, the bisphenol A-bisglycidyl ethers are obtained in the liquid phase or in the solid, higher-molecular weight phase. Solid bisphenol A-bisglycidyl ethers can be processed into solvent-free powder varnishes in conjunction with particularly low-reactive amines, e.g. dicyandiamide. In addition to being inexpensive in manufacture and application, which makes such varnishes unusable for conventionally equipped and designed varnish manufacturers and varnish plants working with liquid varnishes, these powder varnishes have the disadvantage that they must be baked in at temperatures of above 120° C.

The utilization of liquid bisphenol A-bisglycidyl ether and reactive amines, e.g. aliphatic and cycloaliphatic amines, especially with the concomitant use of reactive thinners, e.g. monoglycidyl ethers and/or bisglycidyl ethers of alcohols, makes it possible to produce liquid, conventionally obtainable and applicable, low-solvent content varnishes which are cured at room temperature or at temperatures of up to about 80° C. A serious disadvantage of the otherwise excellent coatings made from these varnishes is their lack of weathering resistance, manifesting itself by loss of luster (chalking) and yellowing. Such coatings furthermore tend to become brittle. With the use of polyaminoamides in place of amines as the curing agents, more elastic coatings are obtained, but a greater amount of solvent is needed for the application of such varnishes due to the high viscosity of the polyaminoamides; thus, these varnishes are less favorable for the environment.

On the basis of the coating characteristics displayed by bisphenol A-bisglycidyl ether/amine varnishes, these are well suitable for use as primers, but are unsuitable for decorative cover coats exposed to outside weather conditions.

More weatherable coatings can be obtained on the basis of epoxidized cycloaliphatic olefins ("olefin oxides") and amines, but such varnishes cannot presently be cured at temperatures of below 100° C.

The production of more weatherproof, cold-set coatings is possible on the basis of bisglycidyl esters of dicarboxylic acids. The best properties are attained with bisglycidyl esters of cycloaliphatic dicarboxylic acids, e.g. hexahydrophthalic acid bisglycidyl ester. Corresponding coatings exhibit satisfactory hardness, good elasticity upon gradual stress (Erichsen depression), but insufficient elasticity upon sudden deformation (impact depression). A further disadvantage of such varnishes is the very short pot life, probably due to the high epoxy group and amine group concentration present in the binder. The weatherability of such coatings is markedly improved as compared to bisphenol A-bisglycidyl ether/amine coatings, but still reaches only a medium level. This can be due perhaps also the high nitrogen content in the coating, which is necessary for optimum curing.

The production of nonpolluting, low-solvent content varnishes which, when cured at room temperature or temperatures of up to 80° C., yield coatings of good weatherability and hardness, as well as excellent elasticity, is thus impossible with the use of the conventional epoxy resins.

Numerous prior art teachings relate to polyesters which carry glycidyl groups. For example, polyester-polycarboxylic acids are used for preliminary extension and hardening of polyepoxides, such as bisphenol A-diglycidyl ethers or dicarboxylic acid-diglycidyl esters, in order to obtain elastic cross-linking products. The polyester-polycarboxylic acids used for the preparation of such products are prepared mostly from a diol and an aliphatic dicarboxylic acid, e.g. 1,6-hexanediol and sebacic acid in a molar ratio of 4:5; see DOS (German Unexamined Laid-Open Application) No. 1,720,427. The process of rendering commercial epoxy resins elastic, however, results in a markedly lower stability with respect to water and chemicals. Utilization of the very highly viscous, preliminarily extended epoxy resins takes place during the preparation of casting resins in the melt. Due to the large amount of solvent required, such epoxy resins are unsuitable for the nonpolluting production of varnishes.

Polyglycidyl esters obtained by reacting polyester-polycarboxylic acids with epichlorohydrin are hardly known, at least on a commercial scale. Although German Pat. No. 1,009,590 describes the reaction of a polyester of adipic acid and butanediol (molar ratio 3:2) with epichlorohydrin by way of the potassium salt, glycidylation takes place only to a very incomplete extent. In case of a more comprehensive reaction with epichlorohydrin, a glycidyl ester is obtained which, when cured with hexahydrophthalic anhydride, yields varnish films which are too soft. In British Pat. No. 884,033 (Example 39), a mixture of an unspecified polyester and phthalic anhydride is reacted with epichlorohydrin in the presence of a basic ion exchanger, thus obtaining an epoxide mixture with a high chlorine content which consequently is unsuitable as a varnish binder.

Furthermore, glycidyl esters with 2–6 epoxide equivalents per mole are conventional which have been obtained from low-molecular weight partial esters carrying carboxyl groups (mostly of a degree of polycondensation = 3) by reacting such esters with epichlorohydrin and an alkali in the presence of catalysts, e.g. see German Pat. No. 1,165,030; British Pat. No. 884,033; DOS No. 1,816,933; DOS No. 1,916,287; British Pat. No. 1,026,141; and DOS No. 1,643,789.

These acidic partial esters are produced by the esterification of one mole of a polyalcohol or polyether dialcohol (see, for example, German Pat. No. 1,904,110) with $n = 2$–6 hydroxy groups and $n$ (in most cases 2) moles of an aromatic, cycloaliphatic or aliphatic dicarboxylic acid and/or the anhydrides thereof. In this process, the hydroxy groups are partially or entirely esterified. As can be seen from comparative experiments, these conventional glycidyl esters, when cured with polyamines, yeild coatings with unsatisfactory mechanical properties; the same holds true for amine-cured coatings of bisglycidyl esters of aliphatic, aromatic and cycloaliphatic dicarboxylic acids, e.g. adipic acid bisglycidyl ester, isophthalic acid bisglycidyl ester or hexahydrophthalic acid bisglycidyl ester.

OBJECTS OF THE INVENTION

Accordingly, it is a general object of this invention to provide improved liquid varnish coating compositions having a low or nil solvent content.

Another object of this invention is to provide varnish coatings which simultaneously exhibit good mechanical properties, high weather resistance and good corrosion protection.

A further object of this invention is to provide liquid varnish coating compositions having a solvent content of only about 0–20% by weight which can be processed by conventional means with minimal emission of solvents into the atmosphere.

An additional object of this invention is to provide an improved binder for liquid varnish coating compositions.

Upon study of the specification and appended claims, further objects and advantages of this invention will become apparent to those skilled in the art.

SUMMARY OF THE INVENTION

Briefly, the above and other objects, features and advantages of the present invention are attained in one aspect thereof by employing, a liquid varnish coating composition having a 0–20% solvent content and comprising a mixture of a binders and optionally conventional auxiliary agents, as the binder, a mixture of:

A) glycidyl esters produced in the usual manner by the reaction of esterification products containing carboxyl groups with an excess of a 2,3-epoxyhaloalkane in the presence of reactive agents which split off hydrogen halide; and B) polyamines with at least 3 active hydrogen atoms linked to nitrogen atoms, wherein the nitrogen atoms are bound to aliphatic and/or cycloaliphatic residues which, in turn, can optionally be bound to an aromatic residue, in such an amount that 0.8–1.5 amino hydrogen equivalents are present for one epoxide equivalent of the glycidyl esters by using in component (A) glycidyl esters containing 1.8–2.5 epoxide equivalents/mole and having epoxy numbers of 0.15–0.4 epoxide equivalents/100 g., OH-numbers of 20–130 mg. KOH/g., and average molecular weights of 450–1500; and by producing same by the glycidylation of esterification products containing carboxyl groups and having acid numbers of 100–350 mg. KOH/g., OH-numbers of 0–100 mg. KOH/g., average molecular weights of 350–1300, and a degree of polymerization (= average number of monomer building blocks in a polyester molecule) of 2.9–9, wherein the esterification products containing carboxyl groups are obtained by a condensation of mixtures I and III, wherein mixture I consists of:

I. (a) 0–50 molar percent of one or more aliphatic polyols with 3 or 4 hydroxy groups and 3–6 carbon atoms and I. (b) Correspondingly 100–50 molar percent of a mixture II of aliphatic and/or cycloaliphatic diols, wherein the hydroxy functions are separated by 2–12 carbon atoms and optionally up to 2 of the carbon atoms can be substituted by oxygen atoms which latter, in turn are separated by at least 2 carbon atoms from each other and from the hydroxy groups, wherein optionally the mixture II can also consist of a single aliphatic or cycloaliphatic diol meeting the above definition, and wherein mixture III consists of:

III. (a) 15–50 molar percent of one or more saturated aliphatic dicarboxylic acids of 4–12 carbon atoms and/or the intramolecular anhydrides thereof and III. (b) 85–50 molar percent of one or more aromatic and/or cycloaliphatic dicarboxylic acids with 6 to 12 carbon atoms, preferably 6 carbon atoms, in the ringsystem, wherein the carboxyl groups are arranged in the 1,2-, 1,3- or 1,4-position — except for terephthalic acid — and/or optionally the cyclic anhydrides thereof wherein optionally up to 30 molar percent of these dicarboxylic acids can be substituted by an aromatic polycarboxylic acid with more than 2 carboxyl groups, optionally in the form of the intramolecular anhydride thereof.

DETAILED DISCUSSION

The present invention provides novel binders, with which solvent-free or low-solvent content liquid varnishes can be prepared which can be processed without emission, or almost free from emission, to coatings having simultaneously good mechanical properties, a very high weathering resistance and good corrosion protection.

This problem is solved, in accordance with the present invention, by using as component (A) glycidyl esters containing 1.8–2.5 epoxide equivalents/mole and having epoxy numbers of 0.15–0.4 epoxide equivalents/100 g., OH-numbers of 20–130 mg. KOH/g., and average molecular weights of 450–1500; and by producing same by the glycidylation of esterification products containing carboxyl groups and having acid numbers of 100–350 mg. KOH/g., OH-numbers of 0–100 mg. KOH/g., average molecular weights of 350–1300, and a degree of polymerization (= average number of monomer building blocks in a polyester molecule) of 2.9–9, wherein the esterification products containing carboxyl groups have been obtained by a condensation of mixtures I and III, wherein mixture I consists of:

I. (a) 0–50 molar percent of one or more aliphatic polyols with 3 or 4 hydroxy groups and 3–6 carbon atoms and I. (b) Correspondingly 100–50 molar percent of a mixture II of aliphatic and/or cycloaliphatic diols, wherein the hydroxy functions are separated by 2–12 carbon atoms and optionally up to 2 of the carbon atoms can be substituted by oxygen atoms which latter, in turn are separated by at least 2 carbon atoms from each other and from the hydroxy groups, wherein optionally the mixture II can also consist of a single aliphatic or cycloaliphatic diol meeting the above definition, and mixture III consists of:

III. (a) 15–50 molar percent of one or more saturated aliphatic dicarboxylic acids of 4–12 carbon atoms and/or the intramolecular anhydrides thereof and III. (b) 85–50 molar percent of one or more aromatic and/or cycloaliphatic dicarboxylic acids with 6 to 12 carbon atoms, preferably 6 carbon atoms, in the ringsystem, wherein the carboxyl groups are arranged in the 1,2-, 1,3- or 1,4-position — except for terephthalic acid — and/or optionally the cyclic anhydrides thereof wherein optionally up to 30 molar percent of these dicarboxylic acids can be substituted by an aromatic polycarboxylic acid with more than 2 carboxyl groups, optionally in the form of the intramolecular anhydride thereof.

The term low-solvent content means within the scope of the present invention, a coating composition containing maximal 20% by weight of solvent, preferably less than 15%, and especially 3–15%.

The glycidyl esters of this invention can be prepared by conventionally reacting esters carrying carboxyl groups, produced from mixtures I and III and denoted hereinbelow as acidic esters, in one or several stages with a 2,3-epoxyhaloalkane while spitting off hydrogen halide. Primarily for economical reasons, the use of epichlorohydrin and/or β-methylepichlorohydrin is preferred.

The procedure can be conducted so that the alkali salts of the acidic esters are reacted at an elevated temperature with an excess of epichlorohydrin and/or β-methylepichlorohydrin, the reaction mixture is filtered off from the thus-separated alkali chloride, and the excess epichlorodhydrin and/or β-methylepichlorohydrin is distilled off, e.g. as described in DOS No. 1,901,955. However, this process is cumbersome, since the alkali salts of the esters must be separately produced in a preliminary stage and then dried.

Another possibility is to react the ester, in the form of the free acid, in one stage with an excess of epichlorohydrin to form the glycidyl ester in the presence of catalysts, e.g. tertiary amines, quaternary ammonium salts or anion exchange resins. During this reaction, the corresponding chlorohydrin ester is first obtained which, by reaction with the excess epichlorohydrin, is reepoxidized, forming the glycidyl ester and glycerol dichlorohydrin. The glycerol dichlorohydrin is distilled off with the epichlorohydrin after termination of the reaction and can be regenerated to epichlorohydrin by treatment with an alkali. An analogous reaction can also be effected with β-methylepichlorohydrin. Such a single-stage process is described in German Pat. No. 1,165,030 and British Pat. No. 884,033. The process has the disadvantage of yielding relatively impure products which, due to rather large proportions of chlorohydrin esters, have a comparatively low epoxy value (i.e. epoxide equivalents per 100 g.) and a high chlorine content.

The glycidyl esters of this invention are preferably produced by directly reacting epichlorohydrin with the acidic esters at 40°–125° C. in the presence of 0.001–1% by weight (based on the reaction mixture) of a catalyst, preferably a quaternary ammonium or phosphonium compound or a tertiary sulfonium compound, and treating the thus-formed chlorohydrin ester with agents to split off hydrogen halide, e.g. sodium hydroxide. Since the boiling point of the reaction mixture under normal pressure (about 1000 millibars) is approximately 125° C. maximum, excess pressure would have to be utilized when using higher reaction temperatures, requiring an unnecessarily high expenditure in apparatus. Reaction temperatures which are too low generally result in fine-grained sediments which are difficult to filter (when using sodium hydroxide, these sediments consist of sodium chloride) and which impede working up of the reaction mixture. Larger amounts of catalyst are undesirable, inasmuch as the reaction is not greatly accelerated thereby and an increasing discoloration of the reaction mixture can occur. In place of epichlorohydrin, it is also possible to use β-methylepichlorohydrin.

Suitable catalysts for addition of epihalohydrin and/or β-methylepihalohydrin and also for splitting off the hydrogen halide include but are not limited to tertiary amines such as triethylamine, tripropylamine, benzyldimethylamine, N,N'-dimethylaniline and triethanolamine; especially quaternary ammonium bases, such as benzyltrimethylammonium hydroxide or choline; quaternary ammonium salts, such as tetramethylammonium chloride, tetraethylammonium bromide and benzyltrimethylammonium chloride; quaternary phosphonium salts, such as tetramethylphosphonium chloride and tetraphenylphosphonium bromide; tertiary sulfonium salts, such as trimethylsulfonium iodide and 2,3-epoxypropylmethylethylsulfonium iodide; and ion exchange resins with tertiary amine or quaternary ammonium groups.

The epichlorohydrin or β-methylepichlorohydrin is used in an excess of 3–20 moles, preferably 5–10 moles, per carboxyl group equivalent of the acidic esters. With the use of less than 3 moles of epichlorohydrin or β-methylepichlorohydrin, glycidyl esters are obtained which are too viscous and are incapable of forming low-solvent content varnishes; the use of more than 20 moles of epichlorohydrin or β-methylepichlorohydrin is uneconomical and furthermore does not result in any appreciable lowering of the resultant glycidyl ester viscosity.

Strong bases are normally utilized for the dehydrohalogenation, such as anhydrous sodium hydroxide or aqueous sodium hydroxide solution, preferably 25–50% by weight sodium hydroxide solution, or also correspondingly other strong bases, such as potassium hydroxide, calcium hydroxide, alkali carbonates or the aqueous solutions thereof. These bases can be added after or during the chlorohydrin formation.

An especially preferred process for the production of the glycidyl esters resides in uniformly adding, during the course of 1–3 hours, 25–50% aqueous sodium hydroxide solution (in a 10–50% excess) to the solution of the ester, boiling under normal pressure in epichlorohydrin and/or β-methylepichlorohydrin containing 0.001–0.1% by weight (based on the reaction mixture) of tetraethylammonium bromide or tetraphenylphosphonium bromide as the catalyst; during this procedure, the water is azeotropically removed from the reaction mixture by the epichlorohydrin or β-methylepichlorohydrin. After removal of the water, the epichlorohydrin or β-methylepichlorohydrin is again uniformly fed to the reaction mixture. It is, of course, also possible to conduct the reaction at lower temperatures and reduced pressure. After the sodium chloride has been filtered off, the solution is treated to remove the catalyst, advantageously with adsorbents enumerated in the Czechoslovakian Pat. No. 119,415 patented Aug. 15, 1966, or of copending, commonly assigned U.S. Pat. application Ser. No. 563,163, filed Mar. 28, 1975, now abandoned, the contents of which are incorporated by reference herein.

Suitable such adsorbents include but are not limited to silica gel, aluminum oxide, bentonites, montmorilonite, bleaching clay or fuller's earth. The adsorbents can advantageously be added to the reaction mixture directly after termination of the dehydrohalogenation at room temperature. The sodium chloride and the adsorbent are then separated simultaneously by filtration.

By concentration of the solution, the glycidyl esters are generally obtained in yields of 90–100%. The epoxide content is normally between 70 and 90% of theory, and the chlorine content is generally between 0.5 and 2.5% by weight.

The thus-obtained glycidyl esters have, on the average, 1.8–2.5, preferably 1.8–2.2 epoxide equivalents/mole calculated from the epoxy number and the molecular weight; epoxy numbers of 0.15–0.4, preferably 0.20–0.35 epoxide equivalents/100 g. determined by titration in chloroform with perchloric acid in the presence of excess tetraethylammonium bromide and glacial acetic acid, indicator crystal violet (= methylrósaniline chloride); OH-numbers of 20–130 mg. KOH/g., preferably 30–80 mg KOH/g. determined by IR spectroscopy in tetrahydrofuran solution; and molecular weights (number average) of 450–1500, preferably 500–1200, determined by vapor pressure osmosis in chlorobenzene. With an epoxide content in the glycidyl esters of below 1.8 epoxide equivalents/mole, only slightly cross-linked coatings result during curing with polyamines, which coatings have only a minor hardness and an unsatisfactory corrosion protection effect, while glycidyl esters with more than 2.5 epoxide equivalents/mole are of an undersirably high viscosity and, when cured with polyamines, yield coatings of unacceptably low elasticity.

The acidic esters required for the reaction with 2,3-epoxyhaloalkanes can be obtained according to conventional esterification methods, such as melt condensation or azeotropic condensation, e.g. see Houben-Weyl, "Methoden der organischen Chemie" (Methods of Organic Chemistry), vol. XIV/2, Georg Thieme Publishers, Stuttgart, 1963, wherein the molecular weight and the degree of polymerization of the esters are controlled conventionally by the selection of the monomeric components employed, their molar ratio and the degree of conversion during esterification.

In particular, condensation is conducted in the melt in one or two stages at temperatures of 130°–250° C., preferably 130°–200° C., wherein the desired degree of conversion is determined by controlling the acid number determined by titration in an aqueous sodium hydroxide solution in acetone solution. In the single-stage process, all monomeric components (polyols and polycarboxylic acids) are simultaneously esterified until the desired degree of conversion has been reached; in the two-stage process, the polyols are first employed in a molar excess as compared to the polycarboxylic acids and condensed to a polyester polyalcohol having an acid number of $\leqq$ 5 mg. KOH/g. in the first stage, which is reacted in the second stage with the remainder of the polycarboxylic acids, optionally with the cyclic anhydrides thereof, to obtain the acidic ester unit the desired degree of conversion has been attained. Examples for melt condensations of several esters are found in DOS's No. 1,816,096; 1,643,789; and 2,019,282.

The esters are condensed until acid numbers of 100–350, preferably 150–330 mg. KOH/g. are obtained, with a polymerization degree of 2.9–9, preferably 2.9–7.5, and especially 2.9–5.5, and molecular weights (number average) of 350–1300, preferably 350–1000. The resultant OH-numbers of the esters are 0–100 mg. KOH/g., preferably 10–70 mg. KOH/g. The OH-numbers and molar masses are determined in the same manner as in case of the glycidyl esters.

Acid numbers of the esters above 350 mg. KOH/g. lead, in the corresponding glycidyl esters, to an epoxide content of more than 2.5 epoxide equivalents/mole and thus to the above-enumerated disadvantages, whereas if the acid numbers of the esters are below 100 mg. KOH/g., glycidyl esters result having too low an epoxide content (<1.8 epoxide equivalents/mole). With a degree of polymerization of the esters above 9, glycidyl esters are obtained which are too viscous and can no longer be used as binders in low-solvent content varnishes, whereas degrees of polymerization below 2.9 lead to a reduction in hardness and a decrease in the corrosion protection effect of the corresponding glycidyl ester coatings. Increases in viscosity are incurred in the corresponding glycidyl esters in case of OH-numbers of above 100 mg. KOH/g., as well as molecular weights of more than 1300 in the esters, making it difficult to process same in varnishes with a low solvent content. In the case of molecular weights above 1300, the corresponding glycidyl ester coatings exhibit only a low degree of cross-linking, resulting in a decrease of the coating hardness.

Low condensation temperatures (130°–190° C.) lead to longer condensation times, but have the advantage when acidic esters with a considerable hydroxy group content are condensed in a single stage that the condensation can be terminated in a reproducible fashion at the desired acid number of the ester by rapid cooling. If, in the two-stage condensation, anhydrides are employed in the second stage, the temperature should not exceed 170° C. in the second stage, since at above 170° C. side reactions including a sublimation of the anhydrides occur.

Suitable polyols to be utilized according to I. (a) include but are not limited to 1,1,1-trimethylolpropane, 1,1,1-trimethylolethane, 1,2,6-hexanethriol, glycerol and pentaerythritol. The aforementioned polyols are employed in amounts of 0–50 molar percent, preferably 5–50 molar percent and especially 5–40 molar percent. When a greater amount of these polyols is utilized in the process, esters are obtained wherein the glycidylation leads to undesirably high-viscosity glycidyl esters. At least 5 molar percent of these polyols reduces the condensation times and, due to the fact that the hydroxy group content is higher in such cases, can result in an improved adhesion of the corresponding glycidyl ester coatings.

Suitable diols to be used in accordance with I. (b) include but are not limited to ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 2,2,4-trimethyl-1,3-pentanediol, diethylene glycol, triethylene glycol, dipropylene glycol, cis- or trans-1,4-bis(hydroxymethyl)cyclohexane and/or mixtures thereof, ethoxylated hydrogenated bisphenol A, cyclododecanediol, isomer mixtures of bis(hydroxymethyl)tricyclo[5,2,1,-0$^{2,6}$]decane, etc. The above-recited diols are used, in accordance with this invention, in amounts of 100–50 molar percent, preferably 95–50 molar percent, and especially 95–60 molar percent.

Suitable aliphatic dicarboxylic acids according to III. (a) include but are not limited to succinic acid, glutaric acid and/or the anhydrides thereof, adipic acid, sebacic acid and azelaic acid. These dicarboxylic acids are used in quantities of 15–50 molar percent, preferably 15–40 molar percent, in accordance with the present invention. When smaller amounts of these dicarboxylic acids are employed, the corresponding glycidyl esters yield only brittle coatings, while the use of more than 50 molar percent of such dicarboxylic acids results in glycidyl esters, the coatings of which have only a minor hardness and insufficient corrosion protection activity.

Advantageous aromatic and cycloaliphatic dicarboxylic acids, according to III. (b) include but are not limited to phthalic acid, isophthalic acid, hexahydrophthalic acid, hexahydroterephthalic acid, endomethylenetetrahydrophthalic acid and methylendomethylenetetrahydrophthalic acid and 1.x.-cyclododecanedicarboxylic acid ($x = 2$–$6$) as well as aromatic polycarboxylic acids of more than 2 carboxyl groups, e.g. 1,2,4-benzenetricarboxylic acid and 1,2,4,5-benzenetetracarboxylic acid. These carboxylic acids are preferably utilized in the form of their cyclic anhydrides, but in part also in the form of their alkyl esters. The aforementioned dicarboxylic acids are used in an amount of 85–50 molar percent, preferably 15–40 molar percent, wherein up to 30 molar percent can be replaced by an aromatic polycarboxylic acid of more than 2 carboxyl groups. With the use of more than 30 molar percent of these aromatic polycarboxylic acids of more than 2 carboxyl groups, glycidyl esters are obtained of an undesirably high viscosity, the coatings of which, though affording a very good corrosion protection, exhibit only minor elasticity.

Suitable polyamines for glycidyl esters of this invention according to (B) are liquid polyamines with at least three active hydrogen atoms bound to at least two nitrogen atoms, wherein the nitrogen atoms are bound to aliphatic and/or cycloaliphatic organic residues, which in turn, can be linked optionally to an aromatic residue. For the preparation of particularly low-solvent content varnishes, liquid polyamines of low viscosity are especially preferred, e.g. of less than 10,000 cps, preferably less than 1,000 cps. (20° C)

Suitable aliphatic amine curing agents include but are not limited to alkyldiamines, e.g. ethylenediamine, 1,2-propylenediamine, 1,3-propylenediamine, tetramethylenediamine, hexamethylenediamine, 2,2,4-trimethylhexamethylenediamine, 2,4,4-trimethylhexamethylenediamine; polyalkylenepolyamines, e.g. triethylenetetramine or tetraethylenepentamine; N-hydroxyethylalkylenepolyamines, e.g. N-hydroxyethyldiethylenetriamine; 1,3,6-triaminomethylhexane, etc.

Suitable amine curing agents wherein the nitrogen atoms are linked to a cycloaliphatic residue or to a cycloaliphatic and aliphatic residue include but are not limited to N-aminoethylpiperazine, N-cyclohexylpropylenediamine, 1,X-diaminocyclohexane (X = 2, 3 or 4), 4,4'-diaminodicyclohexylmethane, 3,3'-dimethyl-4,4'-diaminodicyclohexylmethane, 5-amino-1,3,3-trimethylcyclohexylmethylamine (isophoronediamine), etc.

Curing agents containing aromatic groups can also be used, provided that the amine nitrogen is not directly linked to the aromatic nucleus. Suitable such amines include but are not limited to N-methylbenzyl-1,3-propylenediamine or xylylenediamines.

The aforementioned or equivalent amines can also be modified by chemical reactions, e.g. by reaction with formaldehyde and phenols or urea, or by reaction with less than the stoichiometric quantity of opoxy compounds (preliminary adduct formation), and then used in this form as the curing agents. A thus-modified amine is, for example, 1-[N-(hydroxyphenylmethyl)-aminomethyl]-4-aminomethylcyclohexane.

The curing of the glycidyl esters of this invention with purely aromatic amines, e.g. 4,4'-diaminodiphenylsulfone, dicyandiamide and the derivatives thereof, boron trifluorideamine adducts, etc. generally takes place only starting with temperatures of above 100°–140° C. The utilization of these compounds as curing agents for cold-setting varnishes is thus impossible.

For the production of varnishes, the polyamines are mixed with the glycidyl esters of this invention generally in such a quantitative ratio that preferably there is one equivalent of an amine hydrogen group per each epoxide group equivalent. However, in general, it is also possible to use a lesser amount of amine, e.g. up to 20 equivalent percent, and/or an excess of the amine, e.g. of up to 50 equivalent percent, wherein the optimum for each curing agent can readily be determined by preliminary orientation experiments. In most cases, if the quantity of the amine is decreased to less than 20 equivalent percent, less hard coatings with weaker corrosion protection are obtained, while with the use of a larger excess of the amine than 50 equivalent percent, brittle and less weatherable coatings are obtained.

If desired, the curing of the glycidyl esters according to this invention with the aforementioned polyamines can be accelerated by the addition of conventional catalysts in catalytic amounts, e.g. of 0.1–10% by weight, based on the amount of epoxy resin.

Suitable such catalysts include but are not limited to tertiary amines; quaternary ammonium or phosphonium compounds; phenols; aminophenols, e.g. tris(dimethylamino)phenol; cyclic nitrogen compounds, e.g. imidazole or oxazoline derivatives; p-toluenesulfonic acid; lactic acid and phosphorous acid esters.

Varnishes can be produced from the binders of this invention by first dispersing pigments and optionally fillers in the glycidyl esters, if desired with the addition of solvents, by means of the processing devices customary in the varnish industry, such as three-roller mills or ball mills, before the curing agent is added in the liquid form. Depending upon type and quantity of the additives used, the finished varnish pot-life ranges from 10 min. to 48 hrs.

To obtain especially low-viscosity varnishes of a high degree of pigmentation, it is possible to use 3–20% by weight, preferably 3–15% by weight, of solvents, based on the total varnish. Such varnishes can be applied with the usual spraying units at room temperature or slightly elevated temperature. The thus-produced varnishes can be considered ecologically acceptable in spite of their small solvent content, since the conventional commercial industrial varnishes at present normally contain 40–60% by weight of solvents.

Suitable solvents include but are not limited to aromatic hydrocarbons, ketones and ethers, as well as mixtures of the aforementioned compounds, as they are generally utilized in varnish formulations. Optionally, the solvents can be replaced partially or entirely by so-called reactive thinners, as they are customarily in the epoxy resin technology so that varnishes containing only up to 10% by weight solvent are obtained which are suitable for the preparation of thick-layer varnish coats in one application. Suitable reactive thinners include but are not limited to the monofunctional thinners, such as n-butylglycidyl ether, phenylglycidyl ether, styrene oxide, cresylglycidyl ether and glycidyl esters of α-branched, saturated fatty acids as well as bifunctional thinners, such as butanediol diglycidyl ether, hexanediol diglycidyl ether and 1,4-bis(hydroxymethyl)cyclohexane diglycidyl ether. The use of monofunctional thinners should not exceed 20–25% by weight (based on the glycidyl ester), and the addition of bifunctional thinners can be up to 30% by weight, whereas the content of 1,4-bis(hydroxymethyl)cyclohexane diglycidyl ether can be up to 50%.

The varnishes of this invention can be applied, depending on the adjusted viscosity and the time and conditions of application, by processes known and conventional for the application of liquid varnishes. Due to their limited processing time, the varnishes are preferably applied as two-component systems, preferably using two-component spraying units, with or without a heater, in accordance with the compressed-air, airless or electrostatic methods.

The viscosity of the varnishes can be extensively regulated, in addition to using the varnish recipe for this purpose, by the composition of the acidic esters. Thus, a molar percent ratio of the carboxylic acids recited under III. (a) and III. (b) of 35:65 to 50:50 makes it possible to produce especially low-viscosity glycidyl esters, and thus varnishes of low viscosity on this basis; this can also be attained by using long-chain aliphatic diols and dicarboxylic acids according to I. (b) and III. (a).

The glycidyl esters of this invention can furthermore be added as upgraders to other curable polyepoxide compounds, e.g. to the polyglycidyl ethers of bisphenol A; in the cured products thereof, the esters of this invention effect an increase in elasticity and a greater weathering resistance.

The hardness and elasticity of the coatings obtained from the coating compositions of this invention can be adapted almost in any desired way to the respective requirements by the composition of the acidic esters. The same measures which, as explained above, lead to particularly low-viscosity glycidyl esters also result in very elastic, especially impart-elastic coatings, as they are desirable, for instance, for the coating of metallic coil strips. The use of glycidyl esters based on acidic esters of a degree of polymerization of 5–9 likewise leads to very elastic coatings having very good corrosion protection. The impact elasticity can be further raised, in particular, also by the use of cycloaliphatic diols according to I. (b), especially by using 1,4-dihydroxymethylcyclohexane, wherein the hardness of the coatings is preserved. The use of branched diols, e.g. 2,2-dimethyl-1,3-propanediol, of a larger proportion of 85–70 molar percent of aromatic dicarboxylic acids, or the use of polycarboxylic acids with more than two carboxyl groups according to III. (b) results in increased corrosion protection. By the utilization of such measures, one skilled in the art can readily determine the optimum of coating properties for a specific coating problem.

Coatings produced with varnishes prepared from the coating compositions of this invention are distinguished by simultaneously attaining good mechanical properties, excellent weatherability and good corrosion protection. In this connection, the requirements to be met by ecologically acceptable coating compositions are likewise fulfilled.

The varnish coating compositions of the present invention generally have a solvent content of less than 20%, preferably 3 – 15% and a viscosity of about 15–250 sec. (Ford beaker, 4 mm. 20° C), which allows industrial application by common methods, especially by spraying in a two component unit, in a temperature range of 20°–60° C.

The coating materials according to this invention are noted for their good wetting properties of many substrates, especially on metals, glass, etc. With appropriate formulations, such coating materials do not form runners even with little or no thixotropation, and good spreading is always maintained. Therefore, parts having edges, corners and cutouts or varying thickness can be coated uniformly with the coating materials according to this invention.

The good properties exhibited by the cured coatings of the present invention include:

Pendulum hardness according to DIN 53 157 of 100-200 Sec;

Pencil scratch hardness according to Wolff-Wilborn, 2H-8H;

Elasticity as Erichsen depression according to DIN 53 156 of 5-10 mm;

Crisscross cut adhesion value according to DIN 53 151 of Gt O - Gt 2;

Wheatherability as 20% loss of gloss with Weather-Ometer of at least 600–800 hrs.; and Solvent resistance to alcohols and aromatic hydrocarbons.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following Examples, the temperatures are set forth uncorrected in degrees Celsius; unless otherwise indicated, all parts and percentages are by weight.

EXAMPLES (A) Preparation of the Acidic Esters

Ester A

A mixture of 99.3 parts of ethylene glycol, 576.0 parts of 1,4-bis(hydroxymethyl)cyclohexane (mixture of isomers with about 75% trans-proportion), 321.6 parts of 1,1,1-trimethylolpropane, 584.6 parts of adipic acid, and 1896 parts of phthalic anhydride is heated under an N$_2$-stream for 2 hours to 140° C. and then to 160° C., thus removing about 65 parts of water from the reaction mixture. The reaction is interrupted as soon as the ester has reached an acid number of about 277–280 mg. KOH/g. The cooled product has an acid number of 276 and an OH-number of 26 mg. KOH/g.

Ester B

A mixture of 124.1 parts of ethylene glycol, 576.0 parts of 1,4-bis(hydroxymethyl)cyclohexane (mixture of isomers with about 75% trans-proportion), 268.0 parts of 1,1,1-trimethylolpropane, and 584.6 parts of adipic acid is heated under an N$_2$-stream for 2 hours to 140° C., for 2 hours to 160° C., for 4 hours to 180° C., and then to 190° C., wherein 145 parts of water is removed from the reaction mixture. As soon as the latter has an acid number smaller than 5 mg. KOH/g., the mixture is cooled to 150° C., and 1303 parts of phthalic anhydride is added. The reaction mixture is maintained at 150° C. until the acid number has dropped to 182 mg. KOH/g. The OH-number of the polyester is about 26 mg. KOH/g.

Ester C

A mixture of 186 parts of ethylene glycol, 190 parts of 1,2-propanediol, 504 parts of 1,4-bis(hydroxymethyl)cyclohexane (mixture of isomers with about 75% trans-proportion), 136 parts of pentaerythritol, 1168 parts of adipic acid, and 1776 parts of phthalic anhydride is condensed at 140°–160° C. until the ester has reached an acid number of 296 mg. KOH/g. The OH-number of the ester is about 16 mg. KOH/g.

Ester D 198.6 parts of ethylene glycol, 213.1 parts of 1,2-propanediol, 268.4 parts of 1,1,1-trimethylolpropane, and 584.6 parts of adipic acid are condensed as indicated in connection with ester A at 140°–190° C. until an acid number of ≦ 5 mg. KOH/g. has been attained. During this step, about 140 parts of water is distilled off. After cooling, 1303 parts of phthalic anhydride is added, and the reaction is continued at 150° C. until the acid number of the polyester is 206 mg. KOH/g. The ester has an OH-number of about 40 mg. KOH/g.

Ester E

A mixture of 124.1 parts of ethylene glycol, 360.5 parts of 1,4-bis(hydroxymethyl)cyclohexane (mixture of isomers with about 75% trans-proportion), 67.1 parts of 1,1,1-trimethylolpropane, 730.0 parts of adipic acid, and 740.0 parts of phthalic anhydride is condensed at 140°–160° C. until an acid number of 282 mg. KOH/g. has been reached. The OH-number of the ester is about 17 mg. KOH/g.

Ester F

A mixture of 186.2 parts of ethylene glycol, 95.1 parts of 1,2-propanediol, 102.1 parts of pentaerythritol, 803.8 parts of adipic acid, and 740.6 parts of phthalic anhydride is reacted at 140°–150° C. until the reaction mixture has reached an acid number of 325 mg. KOH/g. After cooling, the ester has an acid number of 322 mg. KOH/g. and an OH-number of about 30 mg. KOH/g.

Ester G 1008 parts of 1,4-bis(hydroxymethyl)cyclohexane (mixture of isomers with about 75% trans-proportion), 469 parts of 1,1,1-trimethylolpropane, 511.5 parts of adipic acid, 290.7 parts of isophthalic acid, and 259.2 parts of phthalic anhydride are condensed at 200° C. until the acid number is smaller than 5 mg. KOH/g. During this process, about 220 parts of water is distilled off. At 150° C., the reaction is continued after the addition of 1036.8 parts of phthalic anhydride until the acid number of the polyester has dropped to 118 mg. KOH/g. The OH-number is about 50 mg. KOH/g.

Ester H 248.3 parts of ethylene glycol, 152.2 parts of 1,2-propanediol, 115 parts of 1,4-bis(hydroxymethyl)cyclohexane (mixture of isomers with about 75% trans-proportion), 160.8 parts of 1,1,1-trimethylolpropane, 467.6 parts of adipic acid, and 118.5 parts of phthalic anhydride are condensed at 140°–190° C. as described in connection with ester A, thus separating about 122 parts of water. After reaching an acid number of ≦ 5, the mixture is cooled to 150° C. and 1303 parts of phthalic anhydride is added thereto. The reaction is continued at 150° C. until an acid number of 209 has been reached. The OH-number of the ester is about 16 mg. KOH/g.

Ester J

A mixture of 74.4 parts of ethylene glycol, 172.8 parts of 1,4-bis(hydroxymethyl)cyclohexane (mixture of isomers with a trans-proportion of 75%), 214.4 parts of 1,1,1-trimethylolpropane, 233.6 parts of adipic acid, and 1108.8 parts of hexahydrophthalic anhydride is heated under an N$_2$-stream for 2 hours to 140° C., then to 150° C., thus removing about 24 parts of water from the reaction mixture. The reaction is terminated as soon as an acid number of 280–284 mg. KOH/g. has been reached. After cooling, the ester has an acid number of 279 mg. KOH/g. and an OH-number of about 20 mg. KOH/g.

The following esters represent comparative examples:

Ester K 155.2 parts of ethylene glycol and 740.6 parts of phthalic anhydride are esterified at 120°–140° C. The resultant ester has an acid number of 326 mg. KOH/g. and an OH-number of about 20 mg. KOH/g.

Ester L

At 110° C., 230.2 parts of glycerin is added to 770 parts of hexahydrophthalic anhydride during the course of 10 minutes. The reaction is carried out at 110° C until the esters have reached an acid number of 281 mg. KOH/g. The OH-number is 134 mg. KOH/g.

(B) Preparation of the Glycidyl Esters

Glycidyl Ester GA 714.2 g. (3.51 carboxyl equivalents) of ester A is dissolved at 20°–70° C. in 3249 g. of epichlorohydrin (35.1 moles). After the addition of 3.57 g. of tetraethylammonium bromide (0.5%, based on the ester), the mixture is rapidly heated to boiling (about 119°–123° C). After a vigorous reflux has been obtained, 421.7 g. of 50% aqueous sodium hydroxide solution (50% excess) is added uniformly dropwise during the course of about 1.5 hours. The water introduced during this procedure and the water formed during the reaction is simultaneously removed azeotropically from the reaction mixture with the aid of epichlorohydrin, and the latter is recycled into the reaction flask after the water has been separated. During the addition of the sodium hydroxide solution, the temperature of the reaction mixture is not to drop below 102° C.; otherwise, the feeding speed of the sodium hydroxide solution is to be slowed down. Subsequently, the mixture is heated further for about 30–60 minutes to remove the last amounts of water. In total, about 280 g. of water is separated. After cooling to room temperature, 100–200 g. of fuller's earth is added within 10 minutes, and the mixture is vigorously stirred for 30 minutes. Thereafter, the reaction mixture is filtered and the precipitate washed thoroughly with epichlorohydrin; the filtrates are combined. After removing the epichlorohydrin by distillation at 100-20 torr, the crude product is concentrated for 6-8 hours at 80° C. and 1 torr, yielding 885 g. (97% of theory) of glycidyl ester GA.

The properties of the glycidyl ester GA, as well as the glycidyl esters GB through GL on the basis of esters B through L, can be seen from the following table. These glycidyl esters were obtained in accordance with the same process as glycidyl ester GA; in higher-molecular glycidyl esters, the amount of tetraethylammonium bromide was reduced to 0.25 - 0.10% (based on the ester).

basis is frequently added before the curing agent is introduced.

As an example, the recipe of Example 1 will be set forth:

| | |
|---|---|
| 72.8 parts of | glycidyl ester GA |
| 12.9 parts of | xylene/MIBK/n-butanol (4:5:1) |
| 0.1 part of | flow agent on silicone resin basis |
| 14.2 parts of | 3,3'-dimethyl-4,4'-diamino-dicyclohexylmethane ("Epikure" 113) |
| 100.0 parts | |

For testing purposes, the varnish is applied to deep-drawn steel sheets, normally having a thickness of 1

TABLE I
Properties of the Glycidyl Esters

| Ester | Glycidyl Ester | Yield of Glycidyl Ester % of Th. | EN | OHN | Molecular Weight (Number Average) | EF | % Cl | Viscosity mPa·s (cp.) (25° C.) |
|---|---|---|---|---|---|---|---|---|
| A | GA | 97 | 0.324 | 55 | 600 | 1.95 | 1.40 | 63,000 |
| B | GB | 95 | 0.230 | 53 | 850 | 1.96 | 1.03 | 470,000 |
| C | GC | 97 | 0.316 | 76 | 580 | 1.83 | 1.39 | 18,000 |
| D | GD | 100 | 0.243 | 61 | 840 | 2.04 | 1.22 | 255,000 |
| E | GE | 96 | 0.306 | 64 | 600 | 1.84 | 1.25 | 11,000 |
| F | GF | 95 | 0.334 | 65 | 570 | 1.92 | 1.73 | 7,000 |
| G | GG | 97 | 0.167 | 77 | 1200 | 2.00 | 1.08 | >2,000,000 |
| H | GH | 90 | 0.241 | 46 | 790 | 1.90 | 1.27 | 230,000 |
| J | GJ | 95 | 0.339 | 45 | 560 | 1.90 | 0.96 | 49,000 |
| K | GK | 100 | 0.305 | 90 | 500 | 1.53 | 1.91 | 120,000 |
| L | GL | 99 | 0.302 | 171 | 620 | 1.87 | 1.18 | 43,000 |

EN = Epoxy number (= epoxide equivalents/100 g.)
OHN = OH-Number (mg. KOH/g.)
EF = Epoxide functionality (= epoxide equivalents/mole)

(C) Preparation of the Varnishes and Coatings General Recipes for unpigmented Varnishes A 70-90% solution of a glycidyl ester in xylene/methyl isobutyl ketone/n-butanol (4 : 5 : 1) is mixed with a polyamine as the curing agent in such a quantitative ratio that one equivalent of an amine hydrogen group (NH-E) is used per one epoxide group equivalent (EE), i.e. the ratio of EE/NH-E is 1 : 1. After a preliminary reaction time of 30-120 minutes at room temperature, the varnish is either applied directly, or optionally a catalyst can be added shortly before application. The coating was examined in each case after 3-4 weeks of curing time at room temperature (about 17°-25° C.).

To improve the flow properties, about 0.1% of a flow agent (based on the solids content) on a silicone resin mm, and glass plates (thickness 5 mm), which have not been pretreated, and is then cured at room temperature. The layer thickness of the films on which the test is carried out amounts normally to 40-50 μ. The hardness is measured in accordance with DIN [German Industrial Standard] 53,157 (pendulum hardness in seconds). The elasticity upon gradual deformation is determined in accordance with DIN 53,156 (so-called Erichsen depression in mm.), while the elasticity upon sudden deformation is determined according to Gardner. In this test, a falling weight of 4 pounds with a spherical impact surface (diameter 0.5 inch) is allowed to fall onto the backside of the coated steel sheet from various heights (reverse impact, measured values between 4 and 160 inch x pound).

The examples and results indicated in Table 2 were obtained analogously to Example 1, insofar as not indicated otherwise.

TABLE 2
Properties of Clear Varnish Coatings

| Example No. | Glycidyl Ester | Curing Agent | EE/NH-E | Pendulum Hardness sec. | Erichsen Depression mm. | Reverse Impact inch × pound |
|---|---|---|---|---|---|---|
| 1 | GA | "Epikure" 113 | 1 : 1 | 215 | 10.0 | 10 |
| 2* | GA | " | 1 : 1 | 215 | 9.9 | 10 |
| 3* | GB | " | 1 : 1 | 176 | >10.0 | 20 |
| 4 | GC | " | 1 : 1 | 151 | >10.0 | 56 |
| 5* | GC | " | 1 : 1 | 169 | >10.0 | 36 |
| 6 | GD | " | 1 : 1 | 131 | >10.0 | 40 |
| 7 | GE | " | 1 : 1 | 130 | >10.0 | >160 |
| 8* | GF | " | 1 : 1 | 130 | >10.0 | >160 |
| 9 | GG | DETA[1] | 1 : 0.9 | 200 | 10.0 | 20 |
| 10 | Bisphenol A-Bisglycidyl Ether[2] | "Epikure" 113 | 1 : 1 | 198 | 1.3 | <4 |
| 11* | " | " | 1 : 1 | 210 | 2.3 | <4 |
| 12 | Hexahydrophthalic Acid Bisglycidyl Ester[3] | " | 1 : 1 | 162 | 7.4 | <4 |

TABLE 2-continued

Properties of Clear Varnish Coatings

| Example No. | Glycidyl Ester | Curing Agent | EE/NH-E | Pendulum Hardness sec. | Erichsen Depression mm. | Reverse Impact inch × pound |
|---|---|---|---|---|---|---|
| 13* | " | " | 1:1 | 181 | 6.6 | <4 |
| 14 | GK | " | 1:1 | 142 | 0.5 | <4 |
| 15* | GK | " | 1:1 | 145 | 0.6 | <4 |
| 16 | GL | " | 1:1 | 132 | 10.0 | <4 |

*In these exampls, 0.5% (based on the EP resin) of tris(dimethylaminomethyl)phenol was used as the curing catalyst.
[1]Diethylenetriamine; in this example, the curing was conducted for 2 hours at 80° C.
[2]"Epikote" 828, EN = 0.52
[3]"Lekutherm" × 100, EN = 0.57

The results show that the glycidyl esters of this invention (Examples 1–9) are distinctly different as compared to the comparative examples (Examples 10–16). The use of the glycidyl esters of this invention makes it possible to produce coatings of good hardness which are markedly more elastic, especially more impact-elastic, than the comparison coatings.

For purposes of further testing, pigmented varnishes were produced.

General Varnish Recipe for White Varnishes

A 60–80% solution of a glycidyl ester in xylene/methyl isobutyl ketone/n-butanol (4 : 5 : 1) is combined, after adding 1% (based on the solids) of a flow agent on silicone resin basis, with 75% of aftertreated rutile as the pigment (based on the binder), and the mixture is triturated on a one-roller mill. Thereafter, the polyamine curing agent is added in equivalent amounts. The preliminary reaction time, i.e. the time period starting with the addition of the curing agent up to the application, was 30 minutes with cycloaliphatic amines and 60–120 minutes with aliphatic amines. After the varnish was applied, it was cured at room temperature. The coatings are tested after 3–4 weeks.

As an example, the recipe of Example 17 is set forth below:

| | |
|---|---|
| 40.5 parts of | glycidyl ester GJ |
| 17.0 parts of | xylene : MIBK : n-butanol, 4:5:1 |
| 35.6 parts of | rutile (aftertreated) |
| 0.1 part of | flow agent on silicone oil basis |
| 6.8 parts of | "Epikure" 113 |
| 100.0 parts | |

The viscosity of this varnish is 30 seconds, after a preliminary reaction time of 30 minutes (4 mm. Ford beaker, 25° 1 C.); this varnish is suitable for the application with a two-component spraying unit. The coatings are tested as in case of the clear varnishes on steel sheets or glass plates, respectively. In addition to the tests described hereinabove, the adhesive strength was also determined by the crisscross cut value according to DIN 53 151. To make these conditions even stricter, the two parallel groups of cutting lines are arranged at an acute angle of 45° with respect to each other; furthermore, a commercial self-adhesive strip is glued over the cutting lines and then suddenly torn off (measuring values Gt 0 to Gt 4). Additionally, the weatherability was tested with a Weather-Ometer with xenon lamp, Type 60 W (company: Brabender) at a blackbody temperature of 45° C. with the 17/3 cycle (17 minutes of light exposure, 3 minutes of water spray). The test was interrupted upon a relative loss of luster of 20%. The luster was determined under an angle of incidence of 45° according to Lange. Before the beginning of light exposure, the luster value of the coatings was above 95%. Finally, the corrosion protection effect was determined on the coatings in accordance with the salt-spray test ASTM B-117-64.

The examples and results indicated in Table 3 were obtained according to analogous varnish recipes as in Example 17. The coatings of the glycidyl esters of this invention (Examples 17–23) have, as compared to those of commercial epoxy resins (Examples 24–26), considerably higher elasticity and better adhesion with, in part, identical hardness. Another characteristic is the marked superiority of the coatings of the present invention with regard to weatherability; these coatings do not show any yellowing, even after an onset of chalking.

Highly pigmented varnishes produced in accordance with the above varnish recipe with the glycidyl esters of this invention can be applied, with solvent contents of about 12–20% (depending on the glycidyl ester, the curing agent, and the pigment), in most cases by the spraying method. With lower solvent contents of about 8–15%, varnishes result which can be applied according to the rolling process and also those which are applied manually. Varnishes having a lower solvent content (<8–12% of solvent) are produced with the use of reactive epoxy resin thinners. In principle, it is even possible to manufacture thinner-containing varnishes without the use of any solvent, but for reasons of flow problems, a minor addition of a solvent (about 3%) is advisable in most cases. In Example 27, the recipe of such a varnish is indicated, which can be processed at 30°–40° C. with the usual spraying units. The thinner employed does not impair the curing behavior of the glycidyl ester and the good coating properties (compare with Example 21).

TABLE 3

Properties of White Varnish Coatings

| Example No. | Glycidyl Ester | Curing Agent | Pendulum Erichsen Hardness sec. | Crisscross Depression mm. | Ometer Cut Value | Weather-Spray Test h. | Salt-Test h. |
|---|---|---|---|---|---|---|---|
| 17 | GJ | "Epikure" 113 | 159 | 10.0 | 0 | 700 | 250 |
| 18 | GJ | Isophorone-diamine | 184 | 9.7 | 1 | 700 | 400 |
| 19 | GJ | N-Aminoethyl-piperazine | 193 | 9.8 | 1 | 800 | 200 |
| 20 | GJ | Triethylene- | 145 | 8.8 | 0 | 900 | 200 |

TABLE 3-continued

Properties of White Varnish Coatings

| Example No. | Glycidyl Ester | Curing Agent | Pendulum Erichsen Hardness sec. | Crisscross Depression mm. | Ometer Cut Value | Weather-Spray Test h. | Salt-Spray Test h. |
|---|---|---|---|---|---|---|---|
| 21 | GA | tetramine "Epikure" 113 | 180 | 9.3 | 1 | 600 | 250 |
| 22 | GB | " | 160 | >10.0 | 0 | >1000 | 400 |
| 23 | GH | " | 154 | >10.0 | 1 | 800 | 200 |
| 24 | Bisphenol A-Bis-glycidyl Ether[1] | " | 190 | 0.8 | 4 | 200 | 150 |
| 25* | " | " | 200 | 0.3 | 4 | 150 | 100 |
| 26 | Hexahydrophthalic Acid Bis-glycidyl Ester[2] | " | 170 | 4.0 | 3 | 400 | 200 |

*Curing catalyst: 0.5% tris(dimethylaminomethyl)phenol
[1]"Epikote" 828, EN: 0.52
[2]"Lekutherm" × 100, EN = 0.57

EXAMPLE 27

| | |
|---|---|
| Glycidyl ester GA | 26.1 parts |
| 1,4-Bis(hydroxymethyl)cyclohexane diglycidyl ether, EN=0.6 | 13.0 parts |
| n-Butyl glycidyl ether | 4.4 parts |
| Xylene/MIBK/n-Butanol 4:5:1 | 3.5 parts |
| Rutile (aftertreated) | 41.5 parts |
| Flow agent on silicone resin basis | 0.1 part |
| "Epikure" 113 | 11.4 parts |
| | 100.0 parts |

The efflux time in a Ford beaker (4 mm. nozzle) is 110 seconds at 25° C.; with a solvent content of 5.0%, the efflux time is 70 seconds.

The coating, cured for 4 weeks at room temperature, has a pendulum hardness of 175 seconds, an Erichsen depression of 8.0 mm., and a stability in the Weather-Ometer of 600 hours.

The preceding examples can be repeated with similar success by substituting the generically and specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an epoxy resin-based liquid varnish coating composition whose binder comprises a polyamine having at least three hydrogen atoms covalently bonded to at least two nitrogen atoms which nitrogen atoms are covalently bonded to aliphatic and/or cycloaliphatic residues which in turn are optionally bonded to an aromatic ring, the improvement wherein the coating composition contains at most up to 25% volatile solvent and the binder is a mixture of (A) glycidyl esters and (B) one or more of said polyamines, in a ratio such that the binder contains 0.8–1.5 amino hydrogen group equivalents per epoxide equivalent of glycidyl ester, wherein the glycidyl esters have 1.8–2.5 epoxide equivalents/mole, an epoxy number of 0.15–0.4 epoxide equivalents/100 g., a hydroxyl number of 20–130 mg. KOH/g. and a number average molecular weight of 450–1500, and are prepared by glycidylating an esterification product containing free carboxyl groups with a molar excess of a 2,3-epoxyhaloalkane in the presence of an agent which splits off hydrogen halide, said esterification product having an acid number of 100–350 1 mg. KOH/g., a hyroxyl number of 0–100 mg. KOH/g., an average molecular weight of 350–1300 and an average degree of polymerization of 2.9–9 and wherein the esterification product is prepared by condensing a reaction mixture consisting essentially of:

a. 100–50 molar percent of at least one aliphatic or cycloaliphatic diol wherein the hydroxyl functions are separated from each other by 2–12 carbon atoms and 0–2 of said carbon atoms are substituted by an oxygen atom which oxygen atoms when present are separaged by at least 2 carbon atoms from each other and from the hydroxyl groups, and correspondingly 0–50 molar percent of at least one aliphatic polyol of 3–6 carbon atoms having 3 or 4 hydroxyl groups; and b. a mixture of 15–50 molar percent of at least one saturated aliphatic dicarboxylic acid of 4–12 carbon atoms or an intramolecular anhydride thereof, and correspondingly 85–50 molar percent of at least one aromatic or cycloaliphatic dicarboxylic acid other than terephthalic acid of 6–12 ring carbon atoms or an intramolecular anhydride thereof, or a corresponding mixture thereof and up to 30 molar percent of an aromatic polycarboxylic acid having 3 or more carboxyl groups or an intramolecular anhyride thereof.

2. A composition according to claim 1 wherein (a) consists essentially of said diol.

3. A composition according to claim 1 wherein (a) includes 5–50 molar percent of said aliphatic polyol.

4. A composition according to claim 1 wherein (b) consists essentially of said saturated aliphatic dicarboxylic acid and said aromatic or cycloaliphatic dicarboxylic acid.

5. A composition according to claim 1 wherein (b) contains 5–30 molar percent of said aromatic polycarboxylic acid of 3 or more carboxyl groups or an intramolecular anhydride thereof.

6. A composition according to claim 1 wherein said glycidyl ester contains 1.8–2.2 epoxide equivalents/mole and has an epoxy number of 0.20–0.35 epoxide equivalents/100 g., a hydroxyl number of 30–80 mg. KOH/g. and a molecular weight of 500–1200.

7. A composition according to claim 1, wherein said polyamine is an aliphatic amine.

8. A composition according to claim 1, wherein said polyamine is one in which the nitrogen atoms are linked to a cycloaliphatic or cycloaliphatic-aliphatic residue.

9. A composition according to claim 1, wherein said polyamine is an aromatic amine in which the amine nitrogen is not directly linked to the aromatic nucleus.

10. A composition according to claim 1 containing 3–10% volatile solvent and wherein B) is 3,3'-dimethyl-4,4'-diaminodicyclohexylmethane.

11. A composition according to claim 1 wherein the 2,3-epoxyhaloalkane employed to produce the glycidyl esters is epichlorohydrin.

12. A composition according to claim 1 wherein (b) is a mixture of adipic acid, alone or in admixture with isophthalic acid, and phthalic or hexahydrophthalic anhydride and wherein the diol of (a) is one or more of ethylene glycol and 1,2-propanediol and 1,4-bis(hydroxymethyl)cyclohexane and the polyol of (a) is one or more of 1,1,1-trimethylolpropane, glycerol and pentaerythritol.

13. A composition according to claim 1 containing 3–10% volatile solvent and wherein B) is 3,3=-dimethyl-4,4'-diaminodicyclohexylmethane, wherein the 2,3-epoxyhaloalkane employed to produce the glycidyl esters is epichlorohydrin, wherein (b) is a mixture of adipic acid, alone or in admixture with isophthalic acid, and phthalic or hexahydrophthalic anhydride and wherein the diol of (a) is one or more of ethylene glycol and 1,2-propanediol and 1,4-bis(hydroxymethyl)cyclohexane and the polyol of (a) is one or more of 1,1,1-trimethylolpropane, glycerol and pentaerythritol.

* * * * *

UNITED STATES PATENT AND TRADEMARK OFFICE
CERTIFICATE OF CORRECTION

PATENT NO. : 4,091,001
DATED : May 23, 1978
INVENTOR(S) : DIETER BERGER

It is certified that error appears in the above–identified patent and that said Letters Patent are hereby corrected as shown below:

Column 20, lines 23-24: reads " 100-350 1 mg.KOH/g.,
                                         a hydroxyl"
                         should read--100-350 mg. KOH/g,
                                      a hydroxyl--.

Column 22, line 6: reads " is 3,3 = -dimethyl-"
                     should read--is 3,3'-dimethyl--.

Signed and Sealed this

Twenty-first Day of November 1978

[SEAL]

Attest:

RUTH C. MASON
Attesting Officer

DONALD W. BANNER
Commissioner of Patents and Trademarks